(12) United States Patent
Ledoux et al.

(10) Patent No.: US 10,113,855 B2
(45) Date of Patent: Oct. 30, 2018

(54) SYSTEM FOR DETERMINING THE THICKNESS OF A LAYER OF RUBBER FOR A TIRE

(71) Applicants: COMPAGNIE GENERALE DES ETABLISSEMENTS MICHELIN, Clermont-Ferrand (CH); Michelin Recherche et Technique S.A., Granges-Paccot (CH)

(72) Inventors: Thomas Ledoux, Clermont-Ferrand (FR); Denis Martin, Clermont-Ferrand (FR); Patrick Meneroud, Meylan (FR); Grégory Michaud, Meylan (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 136 days.

(21) Appl. No.: 14/899,848

(22) PCT Filed: Jun. 20, 2014

(86) PCT No.: PCT/EP2014/062999
§ 371 (c)(1),
(2) Date: Dec. 18, 2015

(87) PCT Pub. No.: WO2014/202747
PCT Pub. Date: Dec. 24, 2014

(65) Prior Publication Data
US 2016/0153763 A1  Jun. 2, 2016

(30) Foreign Application Priority Data
Jun. 20, 2013 (FR) ...................... 13 55857

(51) Int. Cl.
*G01B 7/26* (2006.01)
*G01M 17/02* (2006.01)

(52) U.S. Cl.
CPC .............. *G01B 7/26* (2013.01); *G01M 17/02* (2013.01)

(58) Field of Classification Search
CPC .................... G01B 7/26; G01M 17/02
See application file for complete search history.

(56) References Cited

U.S. PATENT DOCUMENTS

| 4,652,820 A | 3/1987 | Maresca | 324/207 |
| 4,752,739 A | 6/1988 | Wang | 324/230 |

(Continued)

FOREIGN PATENT DOCUMENTS

| DE | 100 00 730 A1 | 7/2001 |
| EP | 1 314 580 A1 | 5/2003 |

(Continued)

OTHER PUBLICATIONS

International Search Report dated Sep. 1, 2014, issued by WIPO in connection with International Applcation No. PCT/EP2014/062999.*

*Primary Examiner* — Son Le
*Assistant Examiner* — David Z Huang
(74) *Attorney, Agent, or Firm* — Fitzpatrick, Cella, Harper & Scinto (57) ABSTRACT

A system for measuring a thickness of a layer of rubber material of a tire includes a sensor. The layer includes a joined face, which is joined to an adjacent metal reinforcement, and a free face, which is in contact with air. The sensor, which measures a distance d between the joined face and the free face, includes a source of a static magnetic field and a sensitive element whose output signal is a function of a level of a local magnetic field. The sensor is positioned in such a way that a magnetic field strength measured by the sensitive element varies when the distance d decreases.

23 Claims, 5 Drawing Sheets

(56) References Cited

U.S. PATENT DOCUMENTS

| | | | |
|---|---|---|---|
| 4,804,912 A | 2/1989 | Lysén | 324/207 |
| 4,847,556 A * | 7/1989 | Langley | G01P 3/488 |
| | | | 324/207.15 |
| 5,467,014 A | 11/1995 | Nix | 324/230 |
| 5,942,893 A * | 8/1999 | Terpay | G01N 27/9033 |
| | | | 324/164 |
| 7,578,180 B2 | 8/2009 | Lionetti et al. | 73/146 |
| 8,240,198 B2 | 8/2012 | Schade et al. | 73/146 |
| 2002/0088527 A1 | 7/2002 | Tanaka et al. | 156/95 |
| 2003/0062891 A1 | 4/2003 | Slates | 324/207.26 |
| 2009/0078347 A1 | 3/2009 | Niklas et al. | 152/154.2 |
| 2009/0102467 A1 * | 4/2009 | Snell | G01D 5/145 |
| | | | 324/207.25 |
| 2010/0276044 A1 * | 11/2010 | Heise | G01B 7/26 |
| | | | 152/154.2 |
| 2012/0276661 A1 | 11/2012 | Iravani et al. | 438/10 |
| 2013/0311130 A1 * | 11/2013 | Horton | F01D 17/02 |
| | | | 702/142 |
| 2016/0161243 A1 * | 6/2016 | Ledoux | G01B 7/26 |
| | | | 73/146 |
| 2016/0169657 A1 * | 6/2016 | Ledoux | G01B 7/26 |
| | | | 73/146 |

FOREIGN PATENT DOCUMENTS

| | | |
|---|---|---|
| JP | S 61-102504 A | 5/1986 |
| JP | H 07-280504 A | 10/1995 |
| JP | 2001-356002 A | 12/2001 |
| JP | 2005-315732 A | 11/2005 |
| WO | WO 2008/059283 A1 | 5/2008 |
| WO | WO 2012/148826 A2 | 11/2012 |

* cited by examiner

SYSTEM FOR DETERMINING THE THICKNESS OF A LAYER OF RUBBER FOR A TIRE

TECHNICAL FIELD

The present invention relates to a system for measuring the thickness of a layer of rubber, and more particularly to the measurement of the thickness of remaining rubber on a tread of a tyre.

PRIOR ART

In a known way, the tread of a pneumatic tyre, or more simply a tyre, regardless of whether it is to be fitted on a passenger vehicle or a heavy transport vehicle, is provided with a pattern comprising, notably, pattern elements or elementary blocks delimited by various main, longitudinal, transverse or oblique grooves, the elementary blocks also possibly comprising various finer slits or sipes. The grooves form channels intended to discharge the water during running on wet ground, and define the leading edges of the pattern elements.

The depth of the tread is at a maximum when a tyre is new. This initial depth may vary according to the type of tyre in question, as well as the use for which it is intended; by way of example, "winter" tyres generally have a pattern depth greater than that of "summer" tyres. When the tyre becomes worn, the depth of the elementary blocks of the pattern decreases and the stiffness of these elementary blocks increases. The increase in the stiffness of the elementary pattern blocks causes a reduction in some performance characteristics of the tyre, such as the grip on wet ground. The water discharge capacity also decreases markedly when the depth of the channels in the pattern decreases.

It is therefore desirable to be able to monitor the development of the wear of the tread of a tyre.

This monitoring is usually carried out by visual observation of the tread by the user or a mechanic, with or without actual measurement with a depth gauge. However, this observation is not very easy to carry out, notably on rear tyres which are harder to access, and furthermore it is not very precise.

Numerous proposals have been made to automate the measurement of the depth of tyre patterns. Such devices can be placed on the roadway on which vehicles run. These devices usually operate by two techniques, either based on optical systems with cameras or lasers, or based on eddy currents.

The systems based on optical systems are costly, have to be embedded in the roadway, and require regular maintenance. Moreover, the measurements are subject to interference due to soiling and the presence or spraying of water, mud, snow, etc.

Documents U.S. Pat. No. 7,578,180 B2 and WO 2008/059283 propose systems for measuring the thickness of the tread of a tyre, comprising sensors sensitive to the eddy currents generated by an exciting magnetic field in the crown reinforcement of the tyre. These systems are placed on a roadway.

However, it has been found that these measurement systems are not entirely satisfactory in some cases. This is because the reinforcement of some tyres is such that the crown of the tyre is insufficiently conductive to allow the establishment of eddy currents. These measurement systems are therefore unsuitable for measuring the thickness of the treads of these tyres.

BRIEF DESCRIPTION OF THE INVENTION

One object of the invention is a system for measuring the thickness of a layer of rubber material of a tyre, the layer comprising a face joined to an adjacent reinforcement made with at least one material having a magnetic permeability greater than the magnetic permeability of air, and a free face in contact with the air, the system comprising a sensor capable of measuring the distance d between the joined face and the free face of the layer of rubber material. This system is characterized in that the sensor comprises a static magnetic field source and a sensitive element whose output signal is a function of the level of the local magnetic field, positioned in such a way that the magnetic field strength measured by the sensitive element varies when the distance d decreases.

According to a first embodiment, the static magnetic field source is formed by at least one coil supplied with direct electrical current.

Advantageously, the coil surrounds, or is surrounded by, a material having high magnetic permeability and low electrical conductivity, such as a ferrite. The presence of the ferrite makes it possible to localize the magnetic field lines and thus provide a more localized measurement of layer thickness.

The presence of the ferrite also makes it possible to measure a stronger magnetic field, thus improving the sensitivity of the sensor for the same supply current.

According to a second embodiment, the static magnetic field source is formed by at least one permanent magnet.

By using a permanent magnet, a measurement can be made with very low power consumption, since only the sensitive element requires a power supply.

The permanent magnet may be such that it has an axial magnetic field.

This permanent magnet may have a geometrical shape in the form of a ring.

This axisymmetrical embodiment has the advantage of being insensitive to the orientation of the metal cords forming the adjacent reinforcement. The sensor is therefore insensitive to the anisotropy of this adjacent layer.

This permanent magnet may equally well be a straight or U-shaped magnetic bar.

Advantageously, the sensor comprises a sensitive element and a plurality of uniaxially magnetized magnets positioned radially and with the same pole orientation as the sensitive element.

According to an advantageous embodiment, the measurement system comprises a source formed by a plurality of permanent magnets positioned in line.

According to an exemplary embodiment, each permanent magnet has a north pole and a south pole, and the permanent magnets are positioned in such a way that the poles are aligned along the same alignment as that of the source magnets, and each pair of adjacent permanent magnets has its polarities inverted.

Advantageously, the sensor comprises a plurality of sensitive elements, each positioned between two permanent magnets. This enables a measurement line to be defined.

According to another exemplary embodiment, the source of the measurement system is formed by a plurality of ring-shaped permanent magnets with an axial magnetic field placed in line, and the axes of the ring-shaped permanent magnets are positioned in the same plane running through the source line and are orientated perpendicularly to this line.

According to an advantageous embodiment, each ring-shaped permanent magnet comprises a sensitive element positioned on its axis.

The sensitive element can be placed on a point of the axis where the magnetic field is zero in the absence of a layer.

This positioning has the advantage of providing a reference point for the measurements for which the output of the sensitive element is zero.

The sensitive element can be chosen from the group of eddy current, magnetoresistive, and magnetostrictive sensors.

According to one object of the invention, the sensor of the measurement system has the advantage of operating in reluctance mode.

Measurement in reluctance mode makes use of the magnetic permeability of the adjacent reinforcement, and has been found to provide high measurement sensitivity to any variation of the distance d.

The measurement system is advantageously positioned in an electrically non-conductive casing whose magnetic properties are similar to those of air.

The casing may be a portable casing.

In this case, the measurement system according to one object of the invention may be used for measuring the thickness of rubber material of a sidewall or of an internal rubber element of a tyre. This measurement can be performed during the manufacture of the tyre or after the completion of this operation.

The casing may also be suitable for positioning on, or embedding in, a roadway.

In this case, the measurement system is preferably used for measuring the thickness of remaining rubber material on a tyre tread.

The invention is particularly applicable to tyres having metal reinforcers in their crowns and/or their carcass plies, such as those to be fitted on vehicles of the passenger or SUV ("Sport Utility Vehicle") type, or on industrial vehicles selected from among vans, heavy transport vehicles—i.e. light rail vehicles, buses, heavy road transport vehicles (lorries, tractors and trailers), and off-road vehicles such as civil engineering vehicles—, and other transport or handling vehicles.

DESCRIPTION OF THE DRAWINGS

The attached figures show a number of embodiments of a measurement system according to one object of the invention, taking as the principal example the application of the invention to the measurement of the thickness of tyre treads.

DETAILED DESCRIPTION OF THE INVENTION

Figure 1:
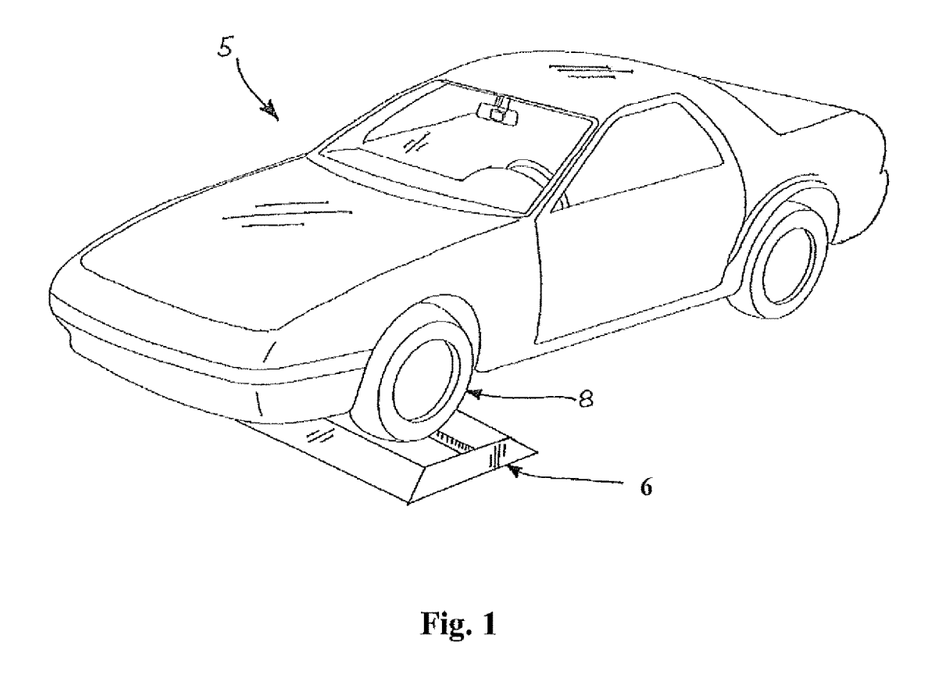
FIG. 1 is a perspective view of a vehicle, a tyre of which is passing over a casing comprising a measurement system according to one object of the invention.

FIG. 1 shows a vehicle 5 whose tyre 8 is running over a casing 6 comprising a wear measurement system. The drawing shows a passenger vehicle, but the measurement system can also be used for any other vehicle, such as a heavy transport vehicle or a coach. The remaining thickness of rubber material on the tread of the tyre 8 is measured when the tyre runs over the casing 6, without any need to stop the vehicle or remove the tyre from the vehicle.

Figure 2:
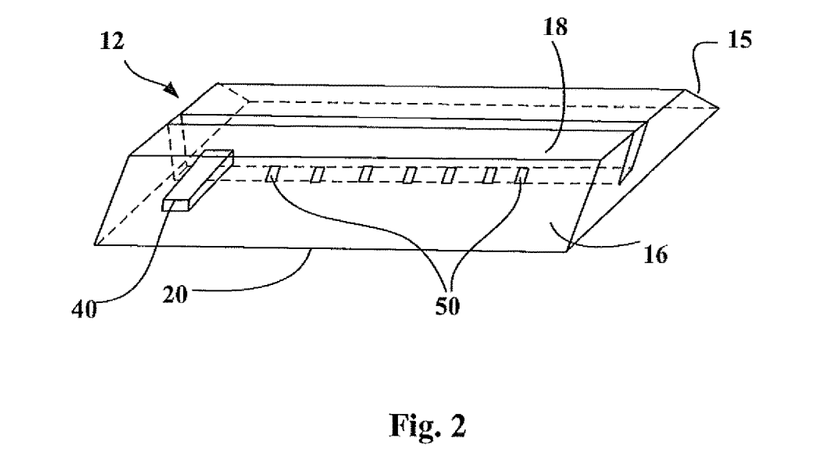
FIG. 2 shows a casing with a measurement system.

FIG. 2 shows a casing 12 according to one of the objects of the invention. This casing takes the form of a portable assembly which can be placed on a roadway. It has a substantially trapezoidal cross section. The casing comprises two inclined portions, namely an access ramp 15 and an exit ramp 16. Between these two portions there is a substantially horizontal portion 18 which is the application face of the casing. The portion 18 of the casing 12 protects a sensor or a row of sensors 50 for making the distance measurements. The base, or bearing face, 20 of the casing is placed against the roadway and gives the casing the necessary stability during the operation of the system. The casing 12 also comprises electronic circuitry 40 with a power source. The measurements are made when the tyre contact area rests on the horizontal portion 18. This horizontal portion is the face of the casing which is applied to the surface of the tyre tread. The casing 12 is made of a non-conductive material whose magnetic properties are similar to those of air, to avoid interference with the measurements.

According to other embodiments, the casing may be embedded in a roadway or may have suitable dimensions and weight for application against a sidewall or an internal rubber element of a tyre.

Figure 3:
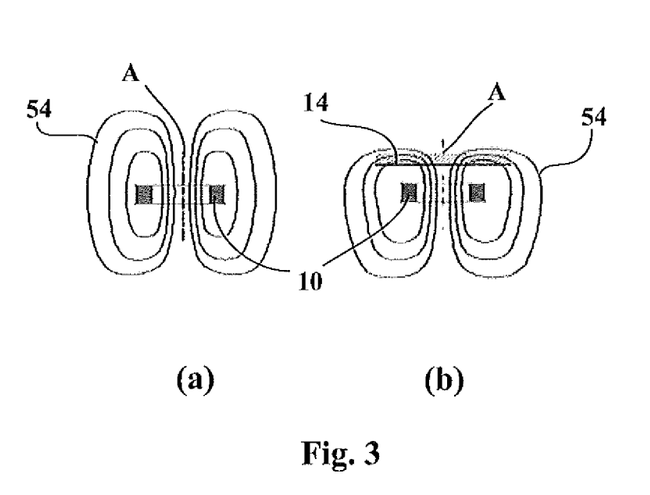
FIG. 3 shows the operating principle of a measurement system in the case of an air-cored coil, in the absence (a) and in the presence (b) of a metal reinforcement.

FIG. 3 shows the operating principle of the sensor of a measurement system according to one object of the invention.

FIG. 3(a) shows an air-cored coil 10 with an axis of symmetry and sensitivity A. When the terminals of the coil are supplied with a direct current, the magnetic field lines 54 emitted by this device extend in the air all around the coil, as shown schematically in FIG. 3(a).

If a metal reinforcement 14, which is a good magnetic field conductor and a poor electrical conductor, such as a crown ply of a tyre consisting of parallel metal reinforcers embedded in two layers of low-conductivity rubber material, is brought towards this device, the field lines will naturally attempt to pass through this metal reinforcement rather than through the air, because the reluctance of air is greater than that of the metal reinforcement. A localization of the magnetic field lines 54 through the metal reinforcement 14 can be observed.

The result is that the magnetic flux density will increase in the area located between the coil 10 and the metal reinforcement.

Since the operating mode of the system according to one object of the invention uses this physical principle and is a reluctance mode, it is related to the magnetic permeability of the different parts of the magnetic circuit formed by the source and the object whose distance is measured with the sensor.

Figure 4:
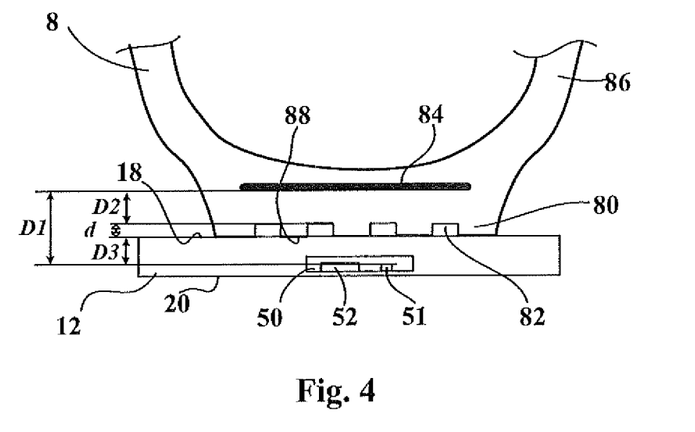
FIG. 4 shows a cross section of a tyre in contact with the casing of the measurement system.

FIG. 4 shows the conditions in which the measurement of the remaining thickness of a tyre tread can take place. It is a sectional view of a tyre on a casing of the measurement system.

Figure 5:
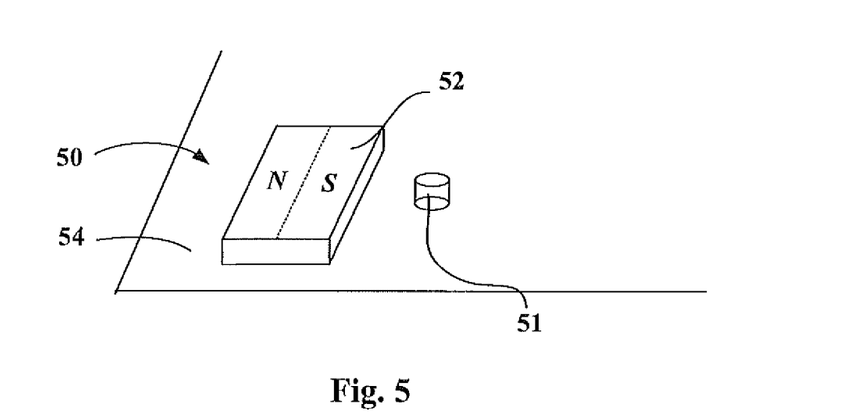
FIG. 5 shows a first exemplary embodiment of a sensor of a measurement system.

The casing 12 protects a sensor 50 for making the distance measurements. The sensor 50 is formed by a source 52 and a sensitive element 51. In this embodiment, the source 52 is a parallelepipedal permanent magnet, and the sensitive element is an eddy current sensor (see FIG. 5). The sensitive element and the source are placed in the same plane 54.

The base 20 of the casing is placed against the roadway and gives the casing the necessary stability during the operation of the system. The casing 12 also contains the electronic circuitry required for making measurements with the sensor 50.

The measurements are made when the contact area of the tyre 8 rests on the application face 18 of the casing 12.

The tyre 8 comprises, notably, a tread 80 with patterns 82, a crown reinforcement 84 consisting of two or more plies of metal reinforcers (not shown), and sidewalls 86. The running surface 88 of the tread 80 bears against the application face 18 of the casing 12.

The sensor 50 measures, as explained above, the distance D1 which separates it from the metal reinforcement 84 of the crown of the tyre 8. D1 has three components. Two of these components are fixed, namely the distance D2 which separates the bases of the patterns 82 from the reinforcement 84, and the distance D3 which separates the sensor 50 from the application face 18 of the casing 12. One component is variable with the degree of wear of the tread, namely d, which corresponds to the remaining thickness of the tread. Thus:

$$d = D1 - D2 - D3$$

The distance D2 can be known on the basis of the identification of the type of tyre being measured. This identification may be manual or automatic, being performed, for example, by retrieving identification data recorded in a transponder such as an RFID device incorporated in the tyre structure.

Figure 6:
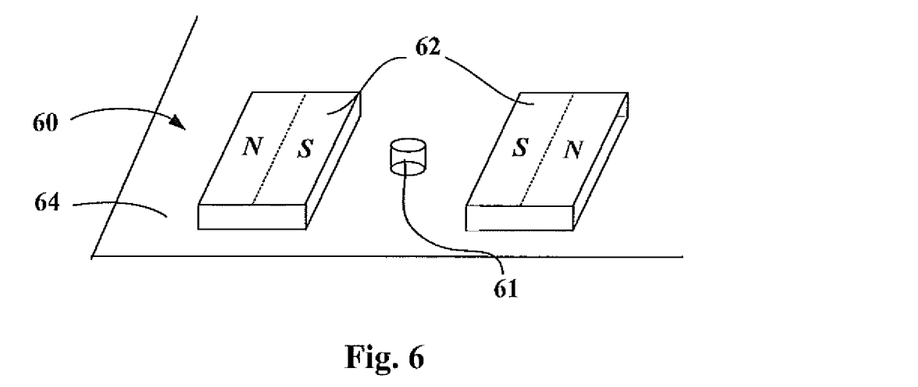
FIG. 6 shows a second exemplary embodiment of a sensor of a measurement system.

FIG. 6 shows an alternative embodiment of the sensor 60 in which the magnetic field source is an assembly of two permanent magnets of parallelepipedal shape 62, whose identical poles, namely the south poles, face one another, the two magnets 62 being positioned in the same plane 64.

In this configuration, the sensitive element 61 can be positioned in the space between the two magnets 62.

Tests with this sensor configuration were conducted with neodymium-iron-boron permanent magnets, which are sintered compounds of powdered neodymium, iron and boron. The geometry of these magnets was: length 19.05 mm, width 12.7 mm and height 6.35 mm. The spacing between the two permanent magnets was 19 mm. The eddy current sensor used was made by Honeywell, reference SS39E.

A section of radial tyre for a heavy transport vehicle was used for these tests, after the rubber of the tread had been planed down. The zero measurement was made when the crown reinforcement was in contact with the application face of the casing 12, after which the section was progressively moved farther away from the application face of the casing.

Figure 7:
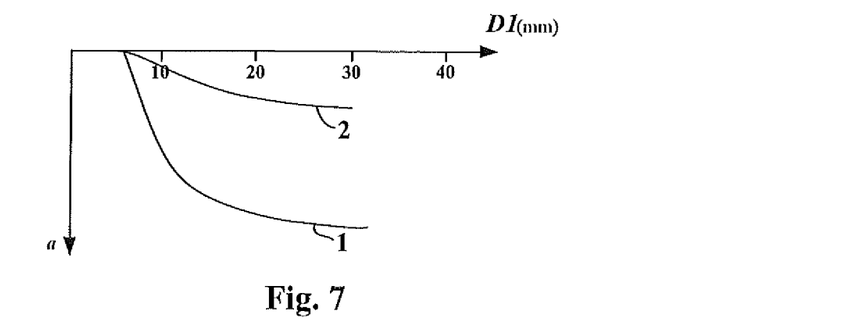
FIG. 7 shows an example of measurements made with the sensor of FIG. 6.

The results are shown in FIG. 7. A very substantial variation can be seen in the local magnetic field strength a up to a spacing of about 25 to 30 mm.

The first curve (1) was plotted with a spacing of 19 mm between the two permanent magnets, while the second (2) was plotted with a double spacing of 38 mm.

These results show that the dynamic range of variation of the signal measured by the sensitive element 61 increases as the space between the two magnets 62 decreases (curve 1).

On the other hand, as the space between the two magnets 62 increases, the linearity of the signal measured by the sensitive element 61 becomes greater (curve 2).

Figure 8:
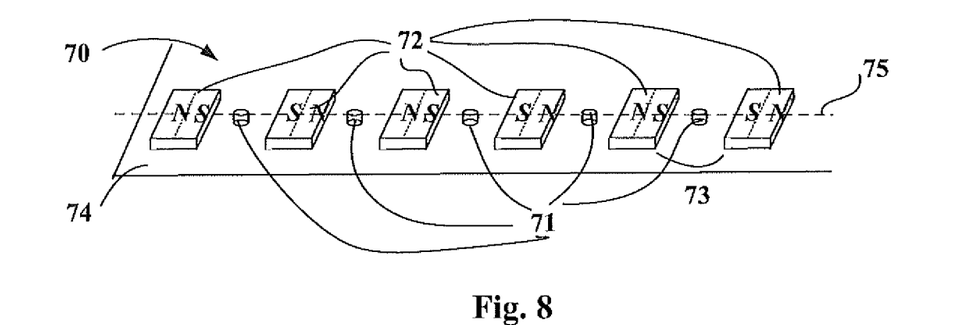
FIG. 8 shows a third exemplary embodiment of a sensor of the measurement system.

FIG. 8 shows another embodiment of the sensor 70 which is an advantageous repetition of the embodiment of FIG. 6.

In this embodiment, a sequence of six parallelepipedal magnets 72 is placed along a measurement line 75, the assembly being placed in the same plane 74.

In this way a static magnetic field source is created, producing a repetition of spaces 73 between the parallelepipedal magnets 72. These spaces 73 are the same number of equivalent areas in magnetic terms, along the line 75.

A sensitive element 71, capable of measuring the development of the local magnetic field, is placed in each of these spaces.

This embodiment of the sensor 70 makes it possible to measure the thickness of the tyre rubber layer at a number of points simultaneously along a line.

Figure 9:
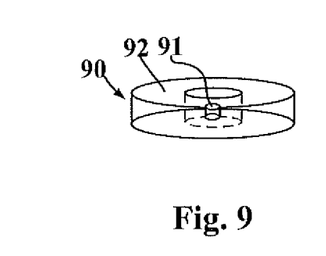
FIG. 9 shows a fourth exemplary embodiment of a sensor of the measurement system.

FIG. 9 shows a fourth embodiment of the sensor 90 in which the magnetic field source is formed by a ring-shaped magnet 92 whose magnetization is axial.

In this embodiment, the sensitive element 91 is advantageously placed on the axis of symmetry of the ring, at a point where the magnetic field is zero if no metal tyre reinforcement is present.

This causes the output signal of the sensitive element 91 to be zero when the sensor 90 is kept at a distance from any metal tyre reinforcement. This has the advantage of avoiding the measurement offset which is present in the embodiments described above.

Tests with this sensor configuration were conducted with two neodymium-iron-boron permanent magnets. Their geometry was: outside diameter 26.75 mm, inside diameter 16 mm and height 5 mm for the first magnet; outside diameter 19.1 mm, inside diameter 9.5 mm and height 6.4 mm for the second. The eddy current sensor used was made by Honeywell, reference SS39E.

The operating procedure for this test was identical to that described above.

Figure 10:
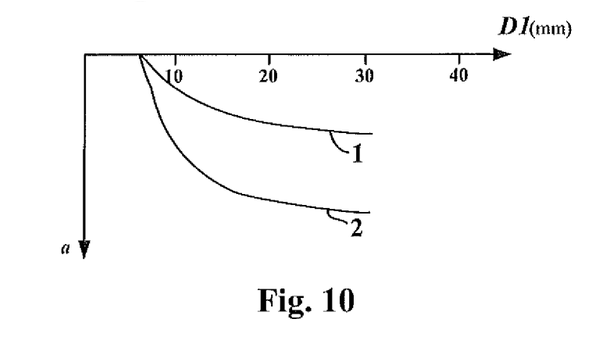
FIG. 10 shows an example of measurements made with the sensor of FIG. 9.

The graph in FIG. 10 shows the results. Once again, a very substantial variation can be seen in the local magnetic field strength a with a variation in the spacing between the measurement system and the metal reinforcement of the tyre crown, from about 5 mm up to 25 to 30 mm.

This graph shows that the dynamic range of variation of the signal measured by the sensitive element 91 increases as the diameter of the ring magnet 92 decreases (curve 2).

On the other hand, as the diameter of the magnet 92 increases, the linearity of the signal measured by the sensitive element 91 becomes greater (curve 1).

This axisymmetrical embodiment has the advantage of being insensitive to the orientation of the metal cords forming the adjacent reinforcement. The sensor is therefore insensitive to the anisotropy of this adjacent layer.

Figure 11:
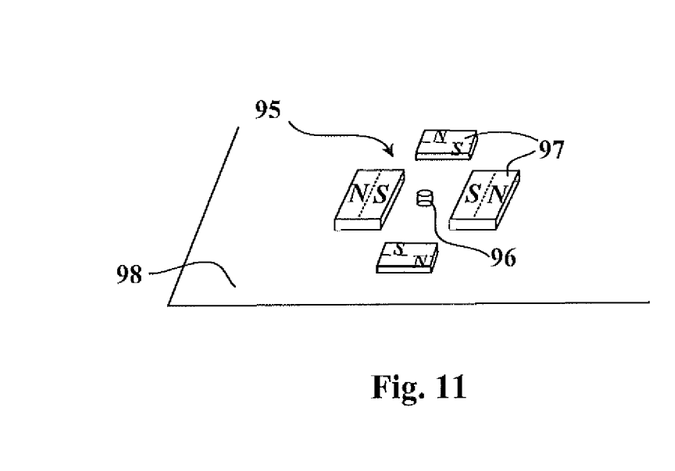
FIG. 11 shows a fifth exemplary embodiment of a sensor of the measurement system.

FIG. 11 shows an alternative embodiment of the sensor 95, in which the magnetic field source is an assembly of four magnets of parallelepipedal shape 97, whose identical poles face one another, the four magnets 97 being positioned on the same plane 98.

In this embodiment, the magnets are positioned in pairs along two perpendicular lines, so that the assembly of four magnets 97 forms a cross-shaped device.

In this configuration, the sensitive element 96 can be positioned in the centre of the cross thus formed.

In this embodiment, the dynamic range of the output signal of the sensitive element 96, as well as the range of the sensor 95, is greater than that obtained with the structure described in FIG. 6.

As for the linearity of the output signal of the sensitive element 96, this increases as the four magnets are spaced farther apart from one another.

Figure 13:
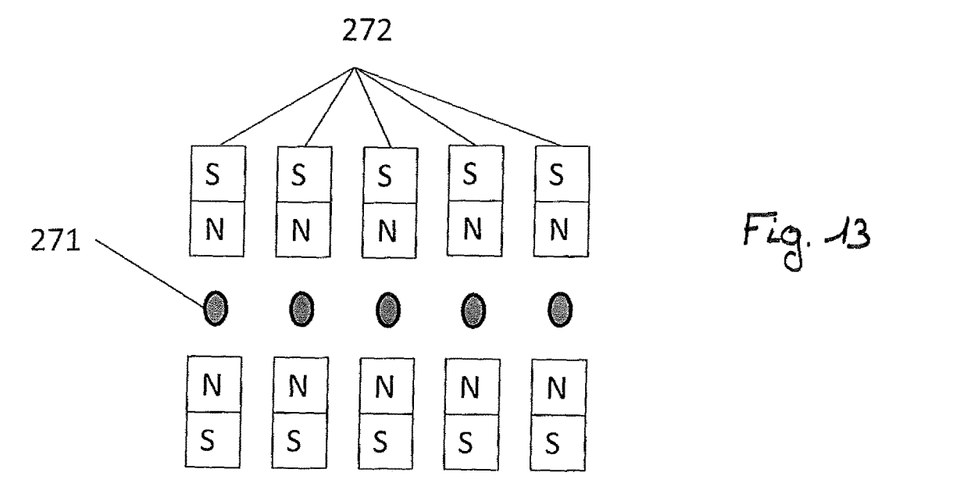
FIG. 13 shows another embodiment.

FIG. 13 shows another embodiment, in which two rows of paralellepipedal magnets 272 are positioned. The north poles of these magnets are positioned face to face in pairs, as shown in the drawing. A row of sensitive elements 271 is positioned between the two rows of magnets 272. These sensitive elements are, for example, eddy current sensors. This configuration can advantageously eliminate the ply edge effects that are found with some of the other configurations.

Figure 12:
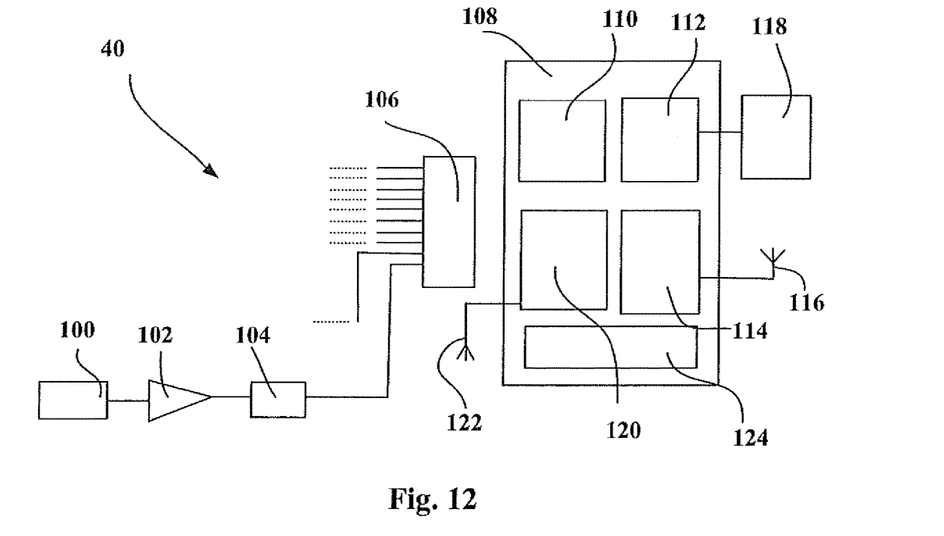
FIG. 12 shows schematically the structure of the electronic circuitry of a measurement system.

FIG. 12 shows the structure of the electronic circuitry 40 for measuring the thickness of a layer of tyre rubber at a plurality of points simultaneously.

In this example, the electronic circuitry 40 uses a multiplexer (MUX) 106 connected to a sequence of sensitive elements 100, provided with a signal conditioning stage 102 and an analogue-digital converter 104.

This multiplexer 106 is connected to a motherboard 108, the functions of which are:
- recording the measurements made by the sensors 100 in a memory 124;
- identifying the tyre, if this can be done by using the presence of an RFID device incorporated in the tyre structure; the motherboard then uses a stage dedicated to the reading of the RFID device 120 with an antenna 122;
- sending the measurement results to a remote server via a wireless communication stage 114 with an antenna 116.

Finally, this motherboard 108 is controlled by a microprocessor 110 and is provided with a power supply stage 112 using a battery 118.

The assembly is able to perform numerous measurements on tyres without a battery change, giving the system several years of service life without human intervention.

The invention claimed is:

1. A system for determining a thickness of a layer of rubber material of a tire, in which the layer of rubber material includes a joined face and a free face, the joined face being joined to an adjacent reinforcement made with at least one material having a magnetic permeability greater than a magnetic permeability of air, and the free face being in contact with air, the system comprising:
   a sensor configured to measure a distance D1 between the joined face and a portion of the sensor, wherein the sensor includes: a static magnetic-field source, and a sensitive element whose output signal is a function of a level of a local magnetic field, the sensitive element being positioned so that a magnetic-field strength measured by the sensitive element varies when the distance D1 decreases,
   wherein the distance D1 is used to determine the thickness of the layer of rubber material, and
   wherein (a) the static magnetic-field source includes a first magnetic-field source and a second magnetic-field source with identical poles facing each other on opposite sides of the sensitive element, or (b) the static magnetic-field source includes a ring-shaped magnetic-field source surrounding the sensitive element.

2. The system according to claim 1, wherein the static magnetic-field source includes at least one coil supplied with a direct electrical current.

3. The system according to claim 2, wherein each of the at least one coil surrounds, or is surrounded by, a ferrite.

4. The system according to claim 1, wherein the static magnetic-field source includes at least one permanent magnet.

5. The system according to claim 4, wherein condition (a) is satisfied, and wherein each of the at least one permanent magnet has an axial magnetic field.

6. The system according to claim 1, wherein condition (b) is satisfied.

7. The system according to claim 5, wherein each of the at least one permanent magnet is a straight bar or a U-shaped bar.

8. The system according to claim 6,
   wherein the static magnetic-field source includes a plurality of permanent magnets having a geometrical shape of a ring, and
   wherein axes of the permanent magnets are arranged in a plane that extends through a source line and are orientated perpendicularly to the source line.

9. The system according to claim 8, wherein each permanent magnet is associated with a sensitive element positioned on the axis of the permanent magnet.

10. The system according to claim 9, wherein each sensitive element is arranged on a point of the axis of the permanent magnet having a zero magnetic field when the layer of rubber material is absent.

11. The system according to claim 4, wherein condition (a) is satisfied, and wherein the static magnetic-field source includes a plurality of uniaxially magnetized magnets, each of the uniaxially magnetized magnets being positioned radially with respect to the sensitive element such that a same pole orientation faces the sensitive element.

12. The system according to claim 4, wherein condition (a) is satisfied, and wherein the static magnetic-field source includes a plurality of permanent magnets positioned in a source line.

13. The system according to claim 12,
   wherein each permanent magnet has a north pole and a south pole,
   wherein the permanent magnets are positioned such that the poles are aligned with the source line, and
   wherein each pair of adjacent permanent magnets has inverted polarities such that poles having a same polarity face each other.

14. The system according to claim 13, wherein the sensor includes a plurality of sensitive elements, each sensitive element being positioned between two adjacent permanent magnets.

15. The system according to claim 1, wherein the sensitive element is one of: a magnetoresistive sensor, a magnetostrictive sensor, and an eddy current sensor.

16. The system according to claim 1, wherein the system is positioned inside an electrically non-conductive casing made of materials having a magnetic susceptibility equal to zero or to a magnetic susceptibility of air or a vacuum environment.

17. The system according to claim 16, wherein the casing is a portable casing.

18. The system according to claim 16, wherein the casing is structured to be positioned on or embedded in a roadway.

19. The system according to claim 16, further comprising electronic circuitry that determines the thickness of the layer of rubber material based on the distance D1 and a predetermined distance between the portion of the sensor and an application face of the casing, the application face being structured for contacting the free face of the layer of rubber material.

20. A method for determining a thickness d of a layer of rubber material of a tire, in which the layer of rubber material includes a joined face and a free face, the joined face being joined to an adjacent reinforcement made with at least one material having a magnetic permeability greater than a magnetic permeability of air, and the free face being in contact with air, the method comprising:

measuring a distance D1 between the joined face and a portion of a sensor by utilizing a system that includes: an electrically non-conductive casing made of materials having a magnetic susceptibility equal to zero or to a magnetic susceptibility of air or a vacuum environment, the casing being structured to include an application face for contacting the free face of the layer of rubber material, and the sensor, which is positioned in the casing and arranged to measure the distance D1, the sensor including: a static magnetic-field source, and a sensitive element whose output signal is a function of a level of a local magnetic field, the sensitive element being positioned so that a magnetic-field strength measured by the sensitive element varies when the distance D1 decreases; and determining the thickness d of the layer of rubber material based on the distance D1, a predetermined distance between the portion of the sensor and the application face, and a predetermined dimension of the tire, wherein (a) the static magnetic-field source includes a first magnetic-field source and a second magnetic-field source with identical poles facing each other on opposite sides of the sensitive element, or (b) the static magnetic-field source includes a ring-shaped magnetic-field source surrounding the sensitive element.

21. The method according to claim 20, wherein the layer of rubber material is a layer of remaining rubber material on a tread of the tire.

22. The method according to claim 20, wherein the layer of rubber material is a layer of a sidewall or an internal rubber element of the tire.

23. The method according to claim 20, wherein the determining of the thickness d of the remaining layer is performed by electronic circuitry of the system.

* * * * *